US009976871B2

(12) United States Patent
Cullinan

(10) Patent No.: US 9,976,871 B2
(45) Date of Patent: May 22, 2018

(54) SOLID-STATE REGISTER INITIATED POLL OF STATUS INFORMATION

(71) Applicant: MUELLER INTERNATIONAL, LLC, Atlanta, GA (US)

(72) Inventor: Thomas Cullinan, Sagamore Beach, MA (US)

(73) Assignee: Mueller International, LLC, Atlanta, GA (US)

(*) Notice: Subject to any disclaimer, the term of this patent is extended or adjusted under 35 U.S.C. 154(b) by 0 days. days.

(21) Appl. No.: 14/954,322

(22) Filed: Nov. 30, 2015

(65) Prior Publication Data
US 2017/0153123 A1 Jun. 1, 2017

(51) Int. Cl.
G01D 4/00 (2006.01)

(52) U.S. Cl.
CPC ............ G01D 4/002 (2013.01); G01D 4/004 (2013.01); G01D 4/008 (2013.01); Y02B 90/241 (2013.01)

(58) Field of Classification Search
CPC ........ G01D 4/002; G01D 4/004; G01D 4/008; G01D 4/00; H04Q 2209/60; Y02B 90/241; Y04S 20/32
See application file for complete search history.

(56) References Cited

U.S. PATENT DOCUMENTS

| 676,656 | A | 6/1901 | Haas |
| 3,045,486 | A | 7/1962 | Thomas et al. |
| 3,067,612 | A | 12/1962 | Smith |
| 3,308,664 | A | 3/1967 | Kullmann |
| 4,663,970 | A | 5/1987 | Sutherland |
| 4,995,643 | A | 2/1991 | Rappart et al. |
| 5,086,292 | A | 2/1992 | Johnson et al. |
| 5,099,348 | A | 3/1992 | Huddleston et al. |
| 5,339,686 | A | 8/1994 | Dejarlais et al. |
| 5,473,322 | A | 12/1995 | Carney |
| 5,631,554 | A | 5/1997 | Briese et al. |
| 5,706,273 | A | 1/1998 | Guerreri |
| 5,910,653 | A | 6/1999 | Campo |
| 6,588,447 | B1 | 7/2003 | Hendey |
| 6,774,807 | B1 | 8/2004 | Lehfeldt et al. |
| 7,007,558 | B1 | 3/2006 | Carpenter |
| 7,565,255 | B2 | 7/2009 | Kanke |
| 8,344,881 | B1 | 1/2013 | Hays |

(Continued)

FOREIGN PATENT DOCUMENTS

| EP | 0359665 | 12/1992 |
| KR | 100959519 | 5/2010 |

OTHER PUBLICATIONS

Zigovszki, Szabolcs; Non-Final Office Action for U.S. Appl. No. 14/490,381, filed Sep. 18, 2014, dated Jul. 13, 2016, 28 pgs.

(Continued)

Primary Examiner — Mirza Alam
(74) Attorney, Agent, or Firm — Taylor English Duma LLP

(57) ABSTRACT

Methods, computer-readable storage media, and systems for signaling a communication device through an AMR interface for an immediate read of status information. It is determined whether the AMR interface is in an idle state, and if the interface is idle, the communication device is signaled to initiate retrieval of the status information through a data line of the AMR interface. Once the communication device initiates communication through the AMR interface, the data line is released.

17 Claims, 4 Drawing Sheets

(56) References Cited

U.S. PATENT DOCUMENTS

| | | | |
|---|---|---|---|
| 9,476,740 | B2 | 10/2016 | Zigovszki |
| 9,671,254 | B2 | 6/2017 | Zigovszki et al. |
| 2002/0126157 | A1* | 9/2002 | Farago .................. G01D 4/002 715/810 |
| 2002/0193144 | A1* | 12/2002 | Belski .................. G01D 4/004 455/557 |
| 2003/0193405 | A1 | 10/2003 | Hunt et al. |
| 2004/0021568 | A1 | 2/2004 | Seal et al. |
| 2005/0066746 | A1 | 3/2005 | Winter |
| 2007/0229256 | A1 | 10/2007 | Seal et al. |
| 2007/0241930 | A1* | 10/2007 | Qureshi ................. G01D 4/002 340/870.02 |
| 2010/0245309 | A1 | 9/2010 | Matsuki |
| 2010/0321205 | A1 | 12/2010 | Olson et al. |
| 2011/0115643 | A1 | 5/2011 | Gilbert |
| 2012/0074927 | A1 | 3/2012 | Ramirez |
| 2013/0088353 | A1 | 4/2013 | Lafrance |
| 2013/0113631 | A1 | 5/2013 | Pitchford |
| 2013/0257630 | A1 | 10/2013 | Brennan et al. |
| 2014/0028465 | A1* | 1/2014 | Cornwall ................. H04Q 9/00 340/870.02 |
| 2014/0281624 | A1 | 9/2014 | Cahill-O'Brien et al. |
| 2014/0282550 | A1* | 9/2014 | Blumenfeld .......... G06F 9/5027 718/100 |
| 2014/0361908 | A1 | 12/2014 | Laird et al. |

OTHER PUBLICATIONS

Zigovszki, Szabolcs; Corrected Notice of Allowability for U.S. Appl. No. 14/490,412, filed Sep. 18, 2014, dated Aug. 3, 2016, 4 pgs.

Zigovszki, Szabolcs; Notice of Allowance for U.S. Appl. No. 14/490,412, filed Sep. 18, 2014, dated Jul. 11, 2016, 9 pgs.

Cole, Martin; Applicant Initiated Interview Summary for U.S. Appl. No. 14/490,095, filed Sep. 18, 2014, dated Jul. 6, 2016, 3 pgs.

Zigovszki, Szabolcs; Non-Final Office Action for U.S. Appl. No. 14/490,403, filed Sep. 18, 2014, dated Mar. 31, 2016, 26 pgs.

Zigovszki, Szabolcs; Non-Final Office Action for U.S. Appl. No. 14/490,412, filed Sep. 18, 2014, dated Apr. 1, 2016, 21 pgs.

Cole, Martin; Non-Final Office Action for U.S. Appl. No. 14/490,095, filed Sep. 18, 2014, dated Jun. 15, 2016, 24 pgs.

Zigovszki, Szabolcs; U.S. Patent Application entitled: Real-Time Flow Compensation in Usage Accumulation, U.S. Appl. No. 14/490,375, filed Sep. 18, 2014, 28 pgs.

Zigovszki, Szabolcs; U.S. Patent Application entitled: Mode Activation Using Light Detection, U.S. Appl. No. 14/490,381, filed Sep. 18, 2014, 31 pgs.

Zigovszki, Szabolcs; U.S. Patent Application entitled: Tamper Detection Through Magnetic Sensing, U.S. Appl. No. 14/490,403, filed Sep. 18, 2014; 24 pgs.

Zigovszki, Szabolcs; U.S. Patent Application entitled: Reverse Flow Detection and Annunciation, U.S. Appl. No. 14/490,412, filed Sep. 18, 2014; 26 pgs.

Cole, Martin; U.S. Patent Application Entitled: Adjustable Meter With Tamper Detection, U.S. Appl. No. 14/490,095, filed Sep. 18, 2014; 36 pgs.

Zigovszki, Szabolcs; International Search Report and Written Opinion for serial No. PCT/US14/44156, filed Aug. 7, 2015, dated Nov. 6, 2015, 9 pgs.

Zigovszki, Szabolcs; PCT Application entitled: Real-Time Flow Compensation in Usage Accumulcation having serial No. PCT/US15/44156, filed Aug. 7, 2015, 26 pgs.

Zigovszki, Szabolcs; International Search Report and Written Opinion for serial No. PCT/US15/50080, filed Sep. 15, 2015, dated Dec. 10, 2015, 8 pgs.

Zigovszki, Szabolcs; PCT Application entitled: Tamper Detection Through Magnetic Sensing having serial No. PCT/US15/50080, filed Sep. 15, 2015, 26 pgs.

Zigovszki, Szabolcs; International Search Report and Written Opinion for serial No. PCT/US15/44147, filed Aug. 7, 2015, dated Nov. 6, 2015, 8 pgs.

Zigovszki, Szabolcs; PCT Application entitled: Reverse Flow Detection and Annunciation having serial No. PCT/US15/44147, filed Aug. 7, 2015, 24 pgs.

Martin, Cole; PCT Application entitled: Adjustable Meter With Tamper Detection having serial No. PCT/US15/44154, field Aug. 7, 2015, 35 pgs.

Martin, Cole; International Search Report and Written Opinion for Application No. PCT/US15/44154, filed Aug. 7, 2015, dated Dec. 31, 2015, 12 pgs.

Zigovszki, Szabolcs; Final Office Action for U.S. Appl. No. 14/490,381, filed Sep. 18, 2014, dated Jan. 31, 2017, 26 pgs.

Cole, Martin; Notice of Allowance for U.S. Appl. No. 14/490,095, filed Sep. 18, 2014, dated Jan. 13, 2017, 13 pgs.

Zigovszki, Szabolcs; Final Office Action for U.S. Appl. No. 14/490,403, filed Sep. 18, 2014, dated Oct. 3, 2016, 23 pgs.

Zigovszki, Szabolcs; Corrected Notice of Allowability for U.S. Appl. No. 14/490,412, filed Sep. 18, 2014, dated Sep. 20, 2016, 7 pgs.

Zigovszki, Szabolcs; Issue Notification for U.S. Appl. No. 14/490,412, filed Sep. 18, 2014, dated Oct. 5, 2016, 1 pg.

Cole, Martin; Final Office Action for U.S. Appl. No. 14/490,095, filed Sep. 18, 2014; dated Oct. 6, 2016; 16 pgs.

Zigovszki, Szaboles; Notice of Allowance for U.S. Appl. No. 14/490,403, filed Sep. 18, 2014, dated Feb. 6, 2017, 9 pgs.

Zigovszki, Szabolcs; International Preliminary Report on Patentability for Application No. PCT/US15/44156, filed Aug. 7, 2015, dated Mar. 30, 2017, 8 pgs.

Zigovszki, Szabolcs; International Preliminary Report on Patentability for Application No. PCT/US15/50080, filed Sep. 15, 2015, dated Mar. 30, 2017, 7 pgs.

Zigovszki, Szabolcs; International Preliminary Report on Patentability for Application No. PCT/US15/44147, filed Aug. 7, 2015, dated Mar. 30, 2017, 7 pgs.

Martin, Cole; International Preliminary Report on Patentability for Application No. PCT/US15/44154, filed Aug. 7, 2015, dated Mar. 30, 2017, 9 pgs.

Zigovszki,Szaboles; Non-final Office Action for U.S. Appl. No. 14/490,375, filed Sep. 18, 2014, dated Apr. 24, 2017, 47 pgs.

Zigovszki, Szabolcs; Advisory Action for U.S. Appl. No. 14/490,381, filed Sep. 18, 2014, dated Jun. 15, 2017, 7pgs.

Zigovszki, Szabolcs; Corrected Notice of Allowability for U.S. Appl. No. 14/490,403, filed Sep. 18, 2014, dated May 5, 2017, 10 pgs.

Zigovszki, Szabolcs; Issue Notiication for U.S. Appl. No. 14/490,403, filed Sep. 18, 2014, dated May 17, 2017, 2 pgs.

Zigovszki, Szaboles; Corrected Notice of Allowability for U.S. Appl. No. 14/490,403, filed Sep. 18, 2014, dated Apr. 21, 2017, 6 pgs.

Zigovszki, Szabolcs; Applicant Initiated Interview Summary for U.S. Appl. No. 14/490,375, filed Sep. 18, 2014, dated Sep. 13, 2017, 3 pgs.

Zigovszki, Szabolcs; Final Office Action for U.S. Appl. No. 14/490,375, filed Sep. 18, 2014, dated Aug. 1, 2017, 22 pgs.

Zigovszki, Szabolcs; Notice of Allowance for U.S. Appl. No. 14/490,375, filed Sep. 18, 2017, dated Oct. 4, 2017, 8 pgs.

Zigowski, Szabolcs; Non-Final Office Action for U.S. Appl. No. 14/490,381, filed Sep. 18, 2014, dated Aug. 24, 2017; 19 pgs.

* cited by examiner

SOLID-STATE REGISTER INITIATED POLL OF STATUS INFORMATION

BACKGROUND

Conventional water, gas, or other utility meters normally include a register for accumulating and displaying usage data for customers and utility provider personnel (e.g., meter readers). A typical mechanical register may include odometer-style wheels and/or dials that collectively record the total volume of product used. These registers may be driven by a mechanical or magnetic coupling with a measuring element inside of a measuring chamber of the meter. Gears in the register convert the motion of the measuring element to the proper usage increment for display on the dials and/or wheels. The mechanical register may further include a means of converting the current position of the dials and wheels to an electronic signal for sending the current usage data electronically to automatic meter reading ("AMR") or advanced metering infrastructure ("AMI") systems for remote reading and/or monitoring of the metered consumption.

As an alternative to mechanical registers, a solid-state register ("SSR") may be utilized in meters by a utility provider. SSRs are totally electronic with no mechanical gearing or moving parts and may interface magnetically with the measuring element inside of the measuring chamber of the meter. The SSR uses electronics and firmware programming to detect flow, accumulate usage, and display usage on an LCD or other electronic display. Other operational metrics beyond usage may also be determined and/or displayed, such as average flow rate, instant flow rate, reverse flow, and the like. The programmatic nature of the SSR may allow a single model of register to be programmed with the appropriate parameters and scaling factors to work with a variety of meters and provide higher consumption resolution and accuracy than mechanical odometer registers. SSRs may also provide for the implementation of features not available in traditional mechanical registers, such as accumulation, display, and reporting of operational metrics beyond usage, alarming capability via AMR/AMI systems for tamper conditions and reverse flow, and the like.

An AMR/AMI system may be programmed with the ability to periodically poll the SSRs to read usage data and gather status information. For example, each SSR may be attached to a communication device that polls the SSR for current usage and status information every few hours and transmits the retrieved information back to the utility provider for processing. However, certain alarm conditions in the utility meter, such as reverse flow, register tampering or removal, and the like, may call for instant notification of the utility provider such that the periodic polling by the attached communication device is inadequate.

It is with respect to these and other considerations that the disclosure made herein is presented.

BRIEF SUMMARY

The present disclosure relates to technologies for signaling a communication device through an AMR interface for an immediate read of status information. According to some embodiments, a method for signaling the communication device to immediately initiate retrieval of the status information comprises determining whether the AMR interface is in an idle state, and if the interface is idle, signaling the communication device through a data line of the AMR interface. Once the communication device initiates communication through the AMR interface, the data line is released.

According to further embodiments, a computer-readable storage medium comprises processor-executable instructions that, when executed by a processing unit in a solid-state register, causes the processing unit to detect that a status flag associated with an alarm condition of the register has changed state. Upon detecting that the status flag has changed state, the processing unit determines whether an AMR interface connecting the solid-state register to a communication device is idle, and if the interface is idle, signals the communication device through a data line of the AMR interface to initiate communications. Once initiation of communication through the AMR interface by the communication device is detected, the processing unit releases the data line.

According to further embodiments, a system comprises a solid-state register and a communication device communicatively connected to the solid-state register through a 3-wire AMR interface. The solid-state register includes a microcontroller. The microcontroller is configured detect that a status flag associated with an alarm condition in the solid-state register has changed state, and upon detecting that the status flag has changed state, signal the communication device through a data line of the 3-wire AMR interface that an immediate poll for status information is required. The microcontroller then waits for communication to be initiated by the communication device through the AMR interface to retrieve the status information, and upon detecting the initiation of communication through the 3-wire AMR interface, releases the data line.

These and other features and aspects of the various embodiments will become apparent upon reading the following Detailed Description and reviewing the accompanying drawings.

BRIEF DESCRIPTION OF THE DRAWINGS

In the following Detailed Description, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

The following detailed description is directed to technologies for signaling a communication device through an AMR interface for an immediate read of status information. Using the technologies described herein, a solid-state register ("SSR") may be configured to signal or "interrupt" an attached communication device in order to compel the device to initiate a query of the SSR for status and/or alarm information. For example, the SSR may be configured to detect various alarm conditions, such as a reverse flow or "backflow" condition, tamper condition, low-battery condition, and the like. The SSR may be further configured to provide status information regarding these alarm conditions to a connected communication device when polled by the device. The communication device may be connected to the SSR via an AMR interface and configured to poll the SSR for usage data, alarm conditions, and other status information periodically, such as once every hour, and transmit the information to a central monitoring system.

However, some alarm conditions, such as the backflow or tamper conditions, may necessitate immediate notification of the central monitoring system. When such conditions occur, the SSR may be configured to utilize the AMR interface to immediately signal the communication device that an important event has occurred, triggering the communication device to immediately initiate a poll of status information from the SSR via the AMR interface. The retrieved status information may then be transmitted to the central monitoring system in near real-time, avoiding fluid contamination, damage to distribution systems, theft of product, and other negative consequences of the delay associated with a conventional periodic polling mechanism.

Figure 1:
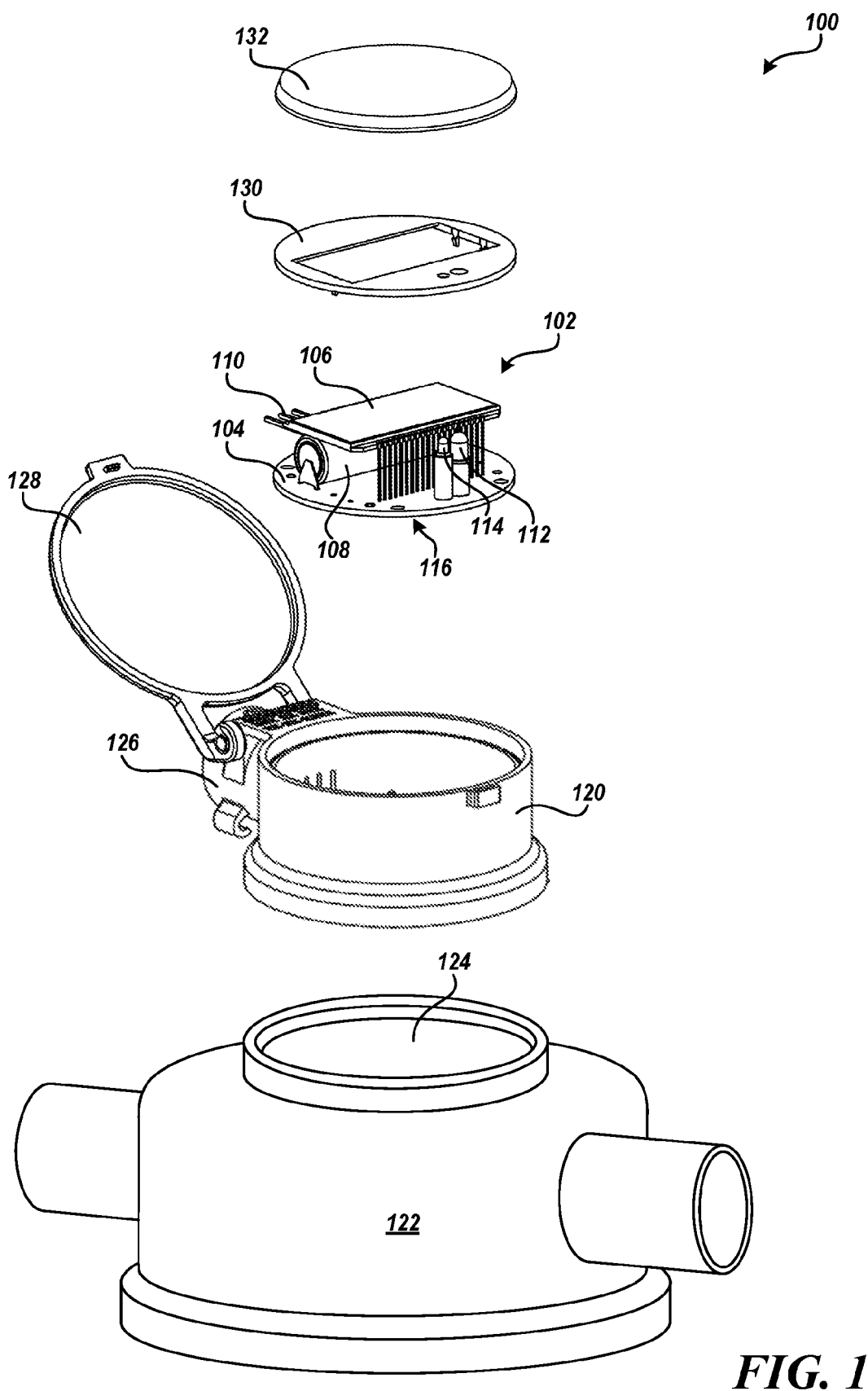
FIG. 1 is a perspective view showing an assembly of an illustrative water meter including a solid-state register, according to embodiments described herein.

FIG. 1 is a perspective view showing an assembly of an illustrative water meter 100 that implements an SSR 102, according to some embodiments. According to embodiments, the SSR 102 comprises a printed circuit board ("PCB") 104 upon which various components are attached. In some embodiments, the SSR 102 may include a liquid crystal display ("LCD") 106 or other electronic display connected to the PCB 104. The LCD 106 may display the accumulated usage to a local observer, such as a customer, installer, meter reader, or other utility provider personnel. The LCD 106 may also display other operational parameter information, such as flow rates, meter ID, model number of the meter 100 and/or SSR 102, test mode accumulation, error codes, and the like. The LCD 106 may further indicate status information for the meter, such as units of measurement displayed, backflow or other alarm conditions, flow direction, current operation mode, battery condition, and the like.

The SSR 102 may further include a battery 108 for powering the operation of the electronic components of the SSR. In some embodiments, the power requirements of the SSR 102 may allow the battery 108 to power the SSR for an extended period of time in normal operation, such as 20 years. The SSR 102 may also include an interface connector 110 for electronically connecting the SSR to an external device, such as an AMR or AMI communication device, a portable programming device, or the like. In some embodiments, the interface connector 110 may comprise a three-wire connector.

The SSR 102 may also include an optical sensor 112 or photo-detector. The optical sensor 112 may allow the SSR 102 to respond to light stimuli, such as from a flashlight, to activate the LCD 106 and/or to set the mode of the LCD display. The optical sensor 112 may also serve as an infrared ("IR") detector. The SSR 102 may further include an IR emitter 114, which together with the optical sensor 112, provides a bidirectional IR port for the SSR to communicate with external devices via IR, such as portable programming devices and the like.

The SSR 102 may be shaped and sized to be inserted into an enclosure 120. The enclosure may be mechanically configured to be attached to the meter 100, such that a bottom surface 116 of the PCB 104 is within a defined distance of a top surface 124 of the measuring chamber 122. The bottom surface 116 of the PCB 104 may hold flow sensors and other detection devices that interface with a magnetic measuring element within the measuring chamber 122, such as rotating magnetic disc. The SSR 102 and the enclosure 120 may be configured to be compatible with a variety of measuring chambers 122 for a variety of models and types of meters 100.

Once positioned in the enclosure 120, the SSR 102 may be covered by a faceplate 130 and lens 132. The faceplate may include openings for the LCD 106, the optical sensor 112, and the IR emitter 114. The lens 132 may be sealed to the enclosure 120 in order to protect the SSR 102 from liquids or other external contaminants. The enclosure 120 may further include a recess 126 through which the interface connector 110 may extend allowing the SSR 102 to be connected to the external devices. The enclosure 120 may also include a cover 128 or lid which may be closed over the SSR 102 in order to protect the lens 132 as well as isolate the optical sensor 112 from external light sources.

Figure 2:
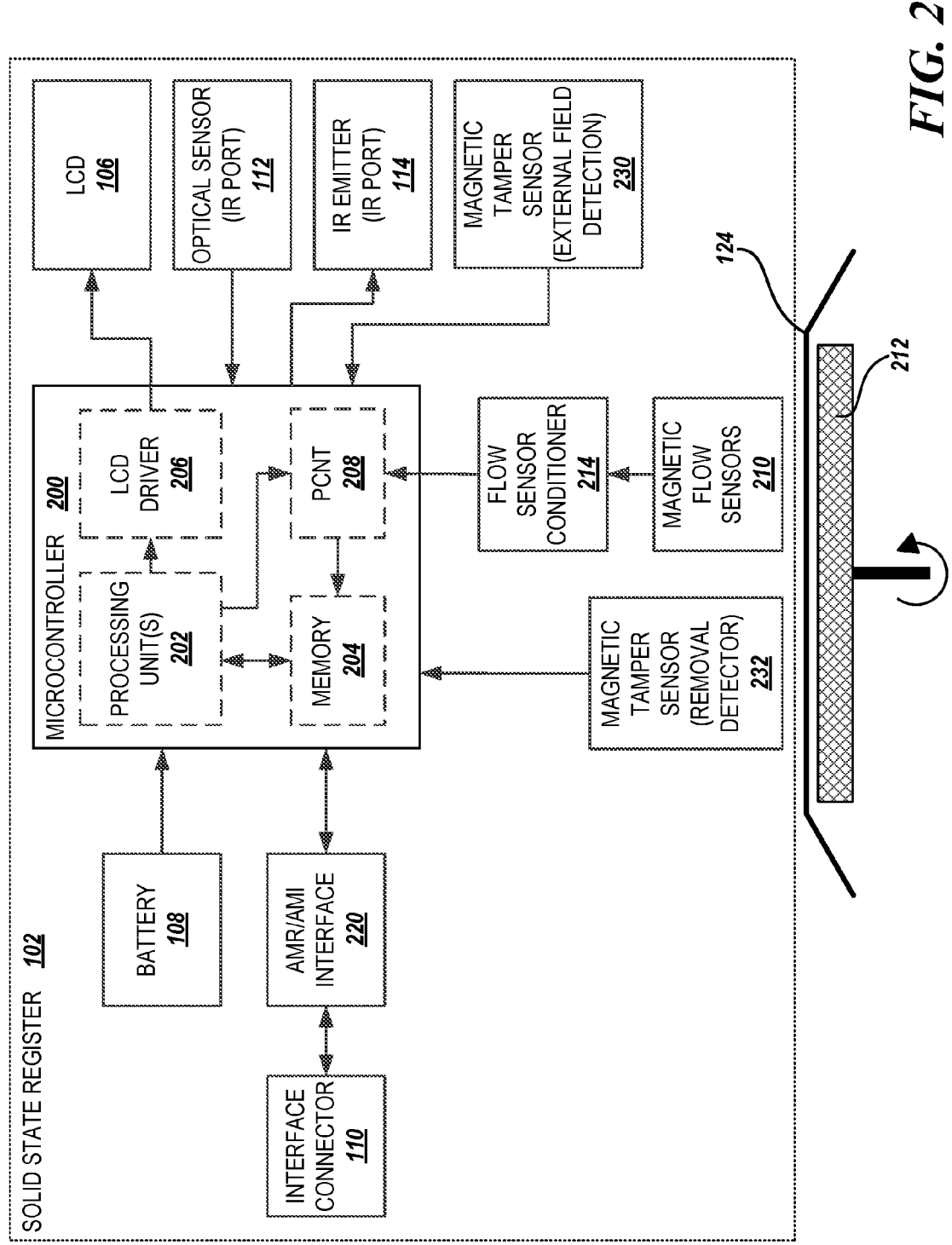
FIG. 2 is a block diagram of an illustrative solid-state register capable of executing the software components described herein for signaling a communication device through an AMR interface for an immediate read of status information, according to embodiments described herein.

FIG. 2 shows a block diagram of the SSR 102, according to some embodiments. The SSR 102 includes a microcontroller 200 for performing the functions of the SSR as described herein. The microcontroller 200 may be a microcontroller unit ("MCU") designed for smart meter applications, such as the MC9S08GW64 from Freescale Semiconductor of Austin, Tex. The microcontroller 200 contains a variety of modules in a single, integrated circuit, including one or more processing units 202. The processing unit(s) 202 represent standard programmable processors that perform arithmetic and logical operations necessary for the operation of the SSR 102. The processing unit(s) 202 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, or the like.

The microcontroller 200 further includes a memory 204. The memory 204 may comprise a computer-readable storage medium for storing processor-executable instructions, data structures and other information. The memory 204 may include a non-volatile memory, such as read-only memory ("ROM") and/or FLASH memory, and a random-access memory ("RAM"), such as dynamic random access memory ("DRAM") or synchronous dynamic random access memory ("SDRAM"). The memory 204 may store a firmware that comprises instructions, commands, and data necessary for operation of the SSR 102. According to some embodiments, the memory 204 may store processor-executable instructions that, when executed by the processing units 202, perform the routine 500 for signaling a communication device through an AMR interface for an immediate read of status information, as described herein.

In addition to the memory 204, the microcontroller 200 may have access to other computer-readable media storing program modules, data structures, and other data described herein for signaling a communication device through an AMR interface for an immediate read of status information. It will be appreciated by those skilled in the art that computer-readable media can be any available media that may be accessed by the microcontroller 200 or other computing system, including computer-readable storage media and communications media. Communications media includes transitory signals. Computer-readable storage media includes volatile and non-volatile, removable and non-removable storage media implemented in any method or technology for the non-transitory storage of information. For example, computer-readable storage media includes, but is not limited to, RAM, ROM, erasable programmable ROM ("EPROM"), electrically-erasable programmable ROM ("EEPROM"), FLASH memory or other solid-state memory technology, compact disc ROM ("CD-ROM"), digital versatile disk ("DVD"), high definition DVD ("HD-DVD"), BLU-RAY or other optical storage, magnetic cassettes, magnetic tape, magnetic disk storage or other magnetic storage devices and the like.

The microcontroller 200 may further include an integrated LCD driver 206 for driving the LCD 106 or other electronic to display accumulated usage information, operations parameters, error codes, status information, and the like. In some embodiments, the LCD 106 may comprise an LCD panel specifically designed for utility meter applications, such as the W527110 LCD panel from Truly Semiconductors Ltd. of Kwai Chung, Hong Kong.

The microcontroller 200 may also include an integrated pulse counter unit 208, also referred to as a position counter ("PCNT"). The pulse counter unit 208 is a low power pulse sequence counter that receives one or more input signals from magnetic flow sensors 210 in the SSR 102. The magnetic flow sensors 210 may represent rotational sensors that sense the rotation of the measurement device, such as a rotating magnet 212, contained in the measurement chamber 122 of the meter 100. The magnetic flow sensors 210 send signals, or "pulses," based on the sensed rotation of the rotating magnet 212 to the pulse counter unit 208 that allow the pulse counter unit to accumulate a pulse count representing a volume of water, gas, electricity, or other product flowing through the meter 100.

In some embodiments, the magnetic flow sensors 210 may comprise a tunneling magnetoresistance ("TMR") angle sensor, such as the NVE AAT001-10E from NVE Corporation of Eden Prairie Minn. The TMR sensor may provide rotational position measurements in a rotating magnetic field that provides the necessary pulse sequences to the pulse counter unit 208 for the pulse counter unit to determine both the flow direction and quantity of the flow. The magnetic flow sensors 210 may be mounted on the bottom surface 116 of the PCB 104 such that they are in proximity of the magnetic field created by the rotating magnet 212 through the top surface 124 when the enclosure 120 containing the SSR 102 is coupled to the measurement chamber 122. According to some embodiments, the signals from the magnetic flow sensors 210 may be pre-processed by a flow sensor conditioner 214 before being provided to the pulse counter unit 208. For example the signals from the magnetic flow sensors 210 may pass through a dual push-pull comparator, such as the Microchip MCP6542 from Microchip Technology Inc. of Chandler, Ariz.

In some embodiments, the pulse counter unit 208 may be configured to operate in a two-signal gray mode (also referred to as quadrature mode) to detect and accumulate pulse counts for both forward and reverse flows. Once configured by the firmware, the pulse counter unit 208 may run independently of the processing units as long as flow is detected in the meter 100. According to some embodiments, the pulse counter unit 208 may maintain two distinct registers, one forward flow pulse counter and one reverse flow pulse counter.

According to some embodiments, the SSR may continuously over-sample the magnetic flow sensors 210 to detect flow. In other embodiments, the SSR 102 may include a flow detector, such as a low-power reed switch or other sensor, that detects a change in the magnetic field from the rotating magnet 212. The flow detector may signal the microcontroller 200 to provide power to the magnetic flow sensors 210 and/or to activate the pulse counter unit 208. In this way, the SSR 102 may operate in an extremely low power mode when no flow is detected to preserve the life of the battery 108. As with the magnetic flow sensors 210, the flow detector may be mounted on the bottom surface 116 of the PCB 104 such that it is in proximity of the magnetic field created by the rotating magnet 212 through the top surface 124 of the measurement chamber 122.

The microcontroller 200 may further connect with other components of the SSR 102 through a variety of interfaces of the microcontroller. For example, the microcontroller 200 interfaces with the optical sensor 112 described above in order to detect changes in external light conditions in order to switch the SSR 102 to the appropriate mode of operation. In some embodiments, the optical sensor 112 may comprise a phototransistor, such as the PT333-3C from Everlight Electronics Co., Ltd. of New Taipei City, Taiwan. In further embodiments, the microcontroller 200 may further utilize interfaces with the optical sensor 112 and the IR emitter 114 to provide an IR port for two-way communication with external devices, for configuration of the SSR 102, updating of the firmware, and the like.

In some embodiments, the SSR 102 may include a number of magnetic tamper sensors, such as magnetic tamper sensors 230 and 232, that interface with the microcontroller 200. For example, an external field detection sensor 230 may interface with the microcontroller 200 and provide a signal when the SSR 102 is subject to an external magnetic field. The external field detection sensor 230 may comprise a digital output magnetic sensor, such as the TCS20DPR from Toshiba of Tokyo, Japan, that may provide an indication of the relative strength of the detected magnetic field. Additionally or alternatively, a removal detector sensor 232 may interface with the microcontroller 200 and provide a signal indicating if the detector is removed from the magnetic field of the rotating magnet 212, indicating that the SSR 102 may have been dislodged or removed from the measurement chamber 122 of the meter 100. In some embodiments, the removal detector sensor 232 may comprise a three-axis digital magnetometer, such as the MAG3110 from Freescale Semiconductor. As with the magnetic flow sensors 210, the removal detector sensor 232 may be mounted on the bottom surface 116 of the PCB 104 such that it is in proximity of the magnetic field created by the rotating magnet 212 through the top surface 124 of the measurement chamber 122.

The microcontroller 200 may further include an AMR/AMI interface 220 for communicating with an external device through the interface connector 110, such as an AMR or AMI communication device, a portable programming device, or the like. The AMR/AMI interface 220 may provide for receiving and responding to interrogatories and commands from the external device, such as a request for accumulated usage data and/or current status information for the SSR. The AMR/AMI interface 220 may further allow the microcontroller 200 to "interrupt" or otherwise initiate communication with the external device, according to further embodiments. In some embodiments, the AMR/AMI interface 220 may utilize a universal asynchronous receiver/transmitter ("UART") module integrated in the microcontroller 200 to provide a 3-wire, two-way serial interface with the external device.

Figure 3:
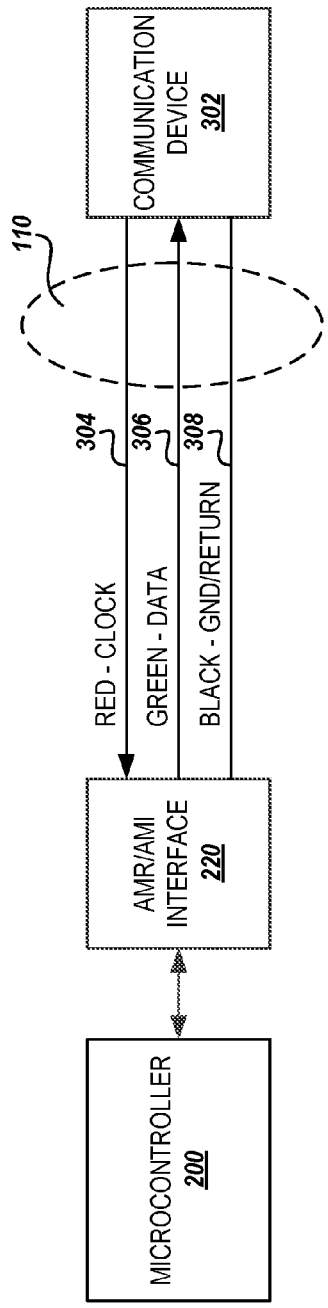
FIG. 3 is a block diagram showing further details of an AMR interface connecting the solid-state register to the communication device.

According to some embodiments, the AMR/AMI interface 220 may comprise a standard 3-wire AMR interface, such as that described in ANSI/AWWA C706-10 Standard for Direct Reading, Remote Registration Systems for Cold-Water Meters. FIG. 3 shows additional aspects of a standard 3-wire AMR/AMI interface 220 utilized to connect the SSR 102 to a communication device 302. The communication device 302 may represent a node in an AMR/AMI network configured with any number of networking topologies known in the art and further connected to a central monitoring system. The AMR/AMI interface 220 may be connected to the communication device 302 through the interface connector 110 by three terminals or "lines": a clock line 304 (red wire), a data line 306 (green wire), and a ground/return line 308 (black wire), as shown in the figure.

In some embodiments, the data line 306 (green wire) may be implemented as an open-collector NPN transistor or an open-drain FET with data transmitted in a synchronous serial mode on the falling edge of a clock signal supplied by the communication device 302 on the clock line 304 (with the data considered valid at the communication device on the rising edge of the supplied clock signal). The AMR/AMI interface 220 may operate at +3.3V, +5V, or other logic level voltage referenced from the data line 306 to the ground/return line 308. Logic "zeroes" may be indicated on the data line 306 by the NPN transistor being ON and logic "ones" by the transistor being OFF. In further embodiments, the clock line 304 (red wire) may also be used as a data receive (input) line while the data line 306 (green wire) is used as a data transmit (output) line for two-way, asynchronous serial data communication between the SSR 102 and the communication device 302.

To initiate a standard AMR cycle comprising the retrieval of usage and status information from the SSR 102, the communication device 302 may present the clock signal on the clock line 304. For example, the communication device 302 may generate an initial +5V level on the clock line 304 for approximately 10 ms and then apply the clocking regime. In some embodiments, the initial high level may be up to 200 ms. The first clock periods after this initial high level may be used for internal synchronization by the SSR 102 and/or microcontroller 200 such that the first data bit being sent on the data line 306 may be delayed by one or more clock periods. The delay period is referred to as "$T_{RDY}$." After detecting the clock signal on the clock line 304 and performing the internal synchronization, the SSR 102 may begin transmitting the usage and status information through the AMR/AMI interface 220 on the data line 306. For example, the transmitted usage and status information may be transmitted in a data message in the following format:

V;RBnnnnnn;IBmmmmmmmm;Ax,x,x,x,x,x,x,x<CR> where:

V is a start of frame character (start bits),
RB is the start of the meter Reading/Billing field,
n . . . n are the 4 to 9 register reading digits,
IB is the start of the Register ID field,
m . . . m are 8 or 10 Register ID characters,
A is the start of the Status field,
x, . . . x are individual status flags, each separated by a comma,
; is a field delimiting character, and
<CR> is the end of message character.

According to some embodiments, the status flags may represent different alarm conditions present in the SSR 102. A value of 1 in a status flag may indicate that the alarm or status condition is present (or has been present). A value of 0 may indicate no alarm or flag. For example, the first status flag may indicate a tamper condition, e.g., an external magnetic interfering field, the second status flag may indicate a low battery condition, the third status flag may indicate a backflow condition, the fourth status flag may indicate a register removal condition, etc. It will be appreciated that any number of status flags may be present within the data message indicating a number of alarm or status conditions detected in the SSR 102 beyond those described herein. It will be further appreciated that data messages of any number of formats and containing various data and information may be transmitted by the SSR 102 to the communication device 302 through the AMR/AMI interface 220 in addition to or as an alternative to the format(s) and information presented herein, depending on the type of interface and the protocols supported by the SSR and/or the communication device.

After the last bit of the last byte of the usage and status information has been sent, the microcontroller 200 may continue to monitor for a clock signal on the clock line 304 and if the clock signal is still present, then the data message may be repeated up to some number of retries, e.g. 10, as along as the clock signal is still present. The microcontroller 200 may also monitor whether the clock signal is removed during transmission of the data message. Upon such detection, the transmission of the data message may be aborted and no further data presented. Upon re-application of the clock signal on the clock line 304, the standard AMR cycle may be restarted from the beginning.

According to further embodiments, the data line 306 of the 3-wire AMR/AMI interface 220 may be dual purposed, allowing the data line to be used by the SSR 102 both for transmitting data to the communication device 302 during the standard AMR cycle described above as well as signaling the communication device to initiate a retrieval of usage and status information from the SSR when the AMR/AMI interface is idle. During the standard AMR cycle, the communication device 302 is the master device on the 3-wire bus with the microcontroller 200 acting as slave and responding with data per the defined protocol. However, when the AMR/AMI interface 220 is idle, as evidenced by the lack of transitions on the clock line 304, for example, the SSR 102 may utilize the data line 306 (green wire) to signal the communication device 302 that an alarm condition or other change in status has been detected and that immediate retrieval of status information is needed. For example, if one of the alarm condition described above changes state, e.g., the register detects a backflow condition, then the microcontroller 200 may utilize the data line 306 to alert the communication device 302 in near real-time. This allows the communication device 302 to immediately initiate the standard AMR cycle and retrieve the status information, including the state change in the alarm condition, and then transmit the alarm condition to the central monitoring system, avoiding the delay that would occur if the communication device 302 waited for the standard polling interval.

In some embodiments, the SSR 102 may maintain an "error status flag" that is set whenever the value of a status flag associated with one of the alarm conditions described changes state. It will be appreciated that the error status flag may indicate both that the alarm condition has been detected as that the alarm condition has been cleared. As shown in timing diagram of FIG. 4, when the error status flag is set and the AMR/AMI interface 220 is idle, the microcontroller 200 or the SSR 102 may turn on the NPN transistor attached to the data line 306 (green wire), driving the data line low (referred to as the "ERR STATUS INDICATOR"). The data line 306 may be held low until the next standard AMR cycle is detected, i.e., until a clock signal is detected on the clock line 304 (red wire).

As the ERR STATUS INDICATOR is a "drive-low" signal in this embodiment, the communication device 302 attached to the AMR/AMI interface 220 must provide the necessary pull-up to detect this change of state in the data line 306. For example, the communication device 302 may be configured to measure the level on the data line 306 periodically, e.g. every 3 seconds, to determine its state. Since the data line 306 is free floating until the SSR 102 drives it low, the communication device 302 may pull up the data line 306 and then measure it. If the data line 306 remains low (because of being driven low by the SSR 102) the communication device 302 knows that the SSR is requesting an immediate poll for usage and status information. In other embodiments, the communication device 302 may be configured with circuitry such that when the AMR/AMI interface 220 is idle, any transition from free-floating to low generates an interrupt in the communication device, causing the device to initiate the standard AMR cycle through the interface.

It will be appreciated that the SSR 102 may alert the communication device 302 of the need for an immediate poll via other methods using the data line 306 of the 3-wire AMR/AMI interface 220 while the interface is idle beyond the "drive-low" method described herein. For example, the SSR 102 may drive the data line 306 high or to a level outside the range of normal logic levels used for data communication over the AMR/AMI interface 220. In further examples, the SSR 102 may apply a signal of a specific frequency to the data line 306 in order to interrupt the communication device 302. The method utilized is a matter of choice depending on the capabilities of the SSR 102 and the communication device 302, and it is intended that all methods of signaling the communication device 302 using the data line 306 while the AMR/AMI interface 220 is idle be included in this disclosure.

Figure 4:
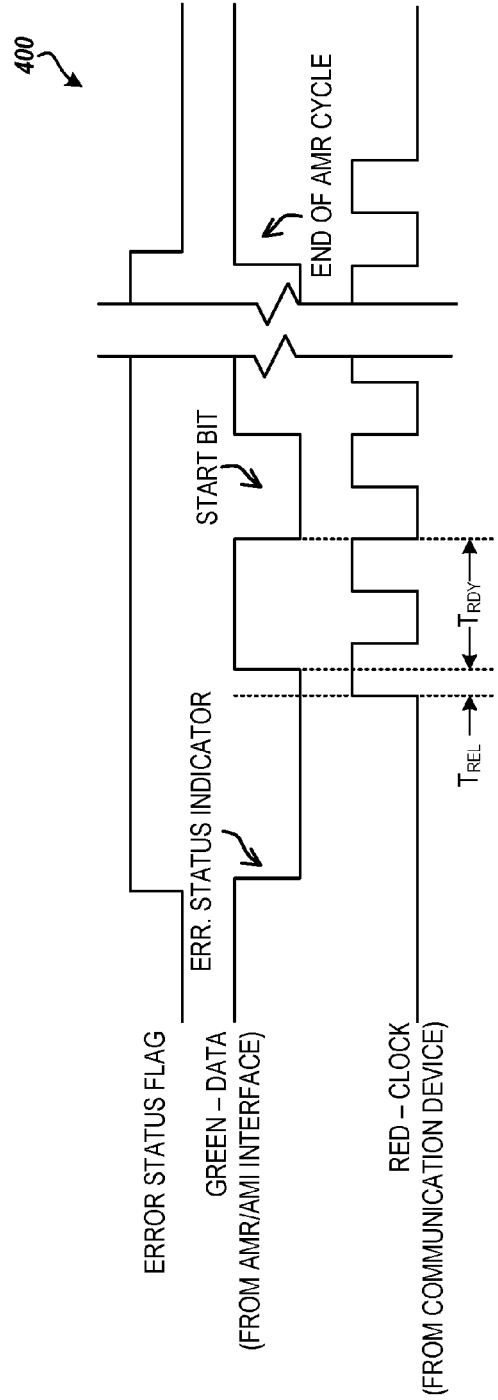
FIG. 4 is a signal-timing diagram showing aspects of one method of signaling a communication device through an AMR interface for an immediate read of status information, according to embodiments described herein.

As soon as the clock signal is detected on the clock line 304, the SSR 102 releases the data line 306 and then the data line is used for subsequent transmission of the data message in synchronization with the clock signal in the AMR cycle. The time to release the data line 306 after the clock signal is detected is shown in FIG. 4 as "$T_{REL}$," and the combined data line release time $T_{REL}$ and internal synchronization time $T_{RDY}$ occurs after detection of the clock signal before the SSR 102 responds with the first bits ("start bits") of the data message.

If the standard AMR cycle completes successfully (i.e., all characters and bits are successfully clocked out of the register and not truncated or otherwise aborted), the communication device 302 stops sending the clock signal on the clock line 304 (red wire) and the SSR 102 clears the error status flag (but not the individual status flags) indicating that the change of state of the status flag associated with the alarm condition has been successfully read. According to some embodiments, if the error status flag is cleared after the end of the AMR cycle, then the NPN transistor is not re-energized. However, if a subsequent state change in a status flag occurs, or if a status flag changes state during a standard AMR cycle, the error status flag will be set, and the data line 306 (green wire) is again driven low by the SSR 102 to indicate the new status condition.

It will be appreciated that the structure and/or functionality of the SSR 102 may be different than that illustrated in FIG. 2 and described herein. For example, while the processing unit(s) 202, memory 204, LCD driver 206, and pulse counter unit 208 are shown as modules integrated into the microcontroller 200, these components may represent discrete circuitry or components, or may be distributed among multiple integrated circuit packages. Similarly, the microcontroller 200, the flow sensor conditioner 214, the AMR/AMI interface 220, and other components of the SSR 102 may be integrated within a common integrated circuit package or distributed among multiple integrated circuit packages. The illustrated connection pathways are provided for purposes of illustration and not of limitation, and some components and/or interconnections may be omitted for purposes of clarity. It will be further appreciated that the SSR 102 may not include all of the components shown in FIG. 2, may include other components that are not explicitly shown in FIG. 2 or may utilize an architecture completely different than that shown in FIG. 2.

Figure 5:
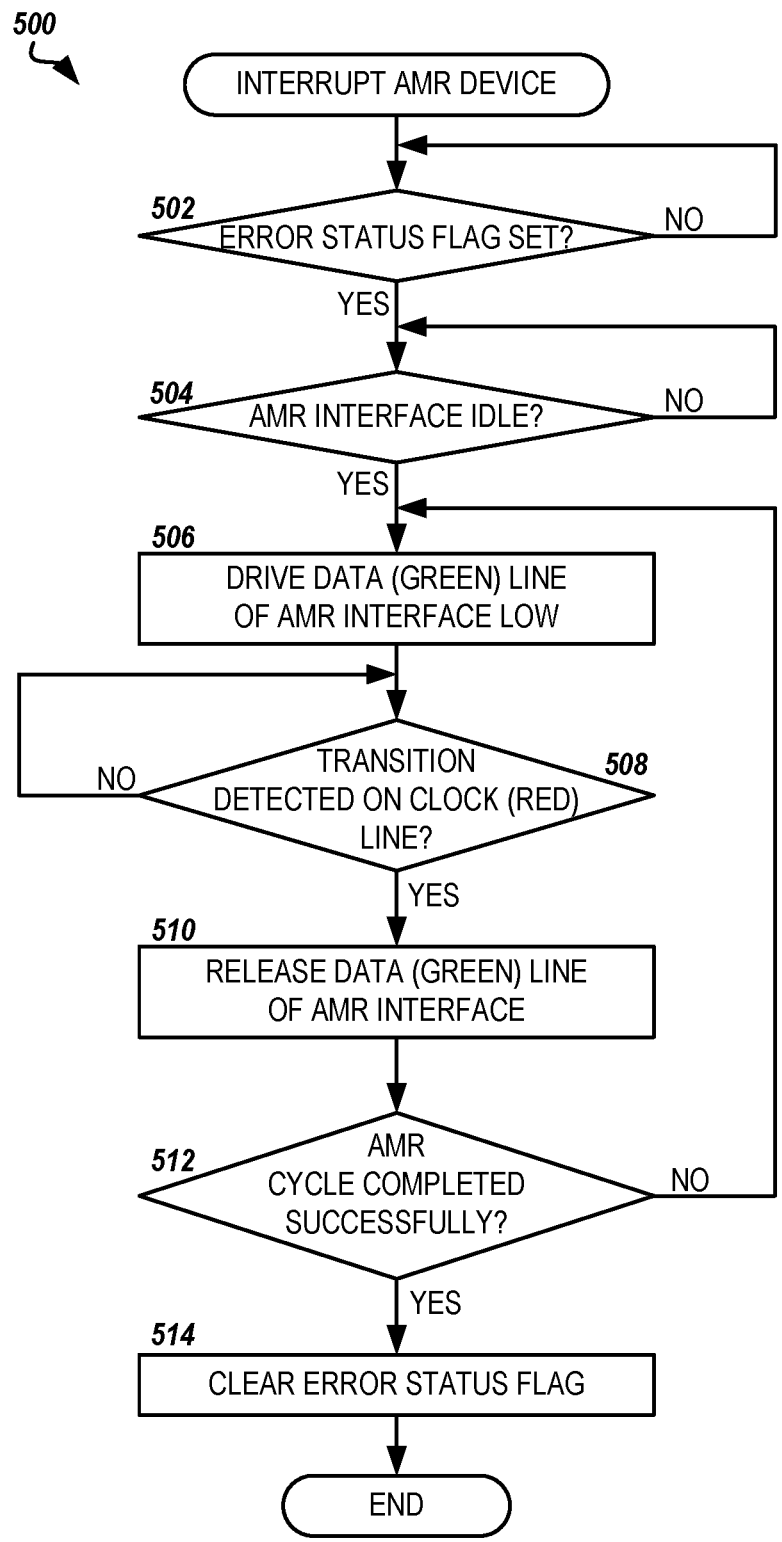
FIG. 5 is a flow diagram showing one routine for signaling a communication device through an AMR interface for an immediate read of status information, according to embodiments described herein.

FIG. 5 is a flow diagram showing one method for signaling a communication device through an AMR interface for an immediate read of status information, according to some embodiments. According to some embodiments, the routine 500 may be performed by the microcontroller 200 of the SSR 102. For example, the microcontroller 200 may be programmed to set the error status flag described above whenever a change in state is detected in a status flag associated with an alarm condition in the register, such as a backflow condition, that needs to be communicated to the central monitoring system immediately instead of waiting for the next polling cycle. It will be appreciated that not all alarm conditions may necessitate an immediate retrieval of status information from the SSR. For example, the SSR 102 may be configured such that low battery alarm conditions do not trigger the routine 500, i.e the error status flag is not set when the status flag associated with low battery condition changes state, and reporting of these status conditions may wait until the next periodic poll by the communication device 302.

The routine 500 begins at step 502, where the microcontroller 200 determines whether the error status flag is set. If the error status flag is not set then no action is taken by the microcontroller 200. If the error status flag is set, then the routine 500 proceeds to step 504, where the microcontroller 200 determines whether the AMR/AMI interface 220 is idle. This may be determined by an absence of a clock signal on the clock line 304, for example. If the AMR/AMI interface 220 is not idle, then the SSR 102 may be in the middle of a standard AMR cycle communication with the connected communication device 302, so the microcontroller 200 waits until the clock signal terminates indicating an end to the AMR cycle.

If the AMR/AMI interface 220 is idle, then the routine 500 proceeds to step 506, where the microcontroller 200 alerts the communication device 302 that an immediate retrieval of usage and status information is needed. In some embodiments, the microcontroller 200 alerts the communication device 302 by driving the otherwise free-floating data line 306 (green wire) of the 3-wire AMR/AMI interface 220 low. This may be accomplished by turning on the open-collector NPN transistor connected to the data line 306 in the AMR/AMI interface 220. From step 506, the routine 500 proceeds to step 508, where the microcontroller waits to detect a transition on the clock line 304 (red wire) on the 3-wire AMR/AMI interface 220. The transition on the clock line 304 may indicate the communication device 302 is initiating a standard AMR cycle to read the usage and status information from the SSR 102.

Once a transition is detected on the clock line 304, the routine 500 proceeds to step 510, where the microcontroller 200 releases the data line 306 so that normal communication with the communication device 302 can occur. As described above in regard to FIG. 4, after the first transition on the clock line 304 occurs, the SSR 102 may wait the time required to release the data line $T_{REL}$ plus the time to internally synchronize to the clock signal $T_{RDY}$ before sending the first bit of the data message in the standard AMR cycle. One or more clock cycles may pass before the data is sent.

Next, the routine 500 proceeds to step 512, where microcontroller 200 waits for the AMR cycle to complete. The completion of the AMR cycle may be detected by the cessation of the clock signal on the clock line 304, for example. If the AMR cycle does not complete successfully, such as if the clock signal is stopped before all bits of the data message can be transmitted, then the routine 500 returns to step 506, where the microcontroller 200 again drives the data line 306 of the AMR/AMI interface 220 low in order to signal the communication device 302 to initiate a new AMR cycle. If the AMR cycle completes successfully, then the routine 500 proceeds to step 514 where the error status flag is cleared indicating the state transition of the status flag associated with the alarm condition has been communicated to the communication device 302 and will be relayed to the central monitoring system. From step 514, the routine 500 ends.

Based on the foregoing, it will be appreciated that technologies for signaling a communication device through an AMR interface for an immediate read of status information are presented herein. While embodiments are described herein in regard to an SSR 102 implemented in a water meter 100, it will be appreciated that technologies described herein may be utilized in any programmable or configurable meter device that is connected to a communication device or node through a 3-wire AMR/AMI interface. The above-described embodiments are merely possible examples of implementations, set forth for a clear understanding of the principles of the present disclosure.

The logical operations, functions or steps described herein as part of a method, process or routine may be implemented (1) as a sequence of processor-implemented acts, software modules or portions of code running on a microcontroller, processing unit, or other computing system and/or (2) as interconnected machine logic circuits or circuit modules within the microcontroller, processing unit or computing system. The implementation is a matter of choice dependent on the performance and other requirements of the system. Alternate implementations are included in which operations, functions or steps may not be included or executed at all, may be executed out of order from that shown or discussed, including substantially concurrently or in reverse order, depending on the functionality involved, as would be understood by those reasonably skilled in the art of the present disclosure.

It will be further appreciated that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

Many variations and modifications may be made to the above-described embodiments without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

What is claimed is:

1. A method for initiating an immediate read of status information in a meter device by a communication device connected to the meter device through a 3-wire automatic meter reading ("AMR") interface consisting of a data line, a clock line, and a ground/return line, the 3-wire AMR interface configured for communications through a standard AMR cycle with the communication device acting as the master device and the meter device acting as the slave device, the method comprising the steps of:
   determining, by the meter device, if the 3-wire AMR interface is in an idle state;
   upon determining that the 3-wire AMR interface is in an idle state, signaling, by the meter device, the communication device through the data line of the 3-wire AMR interface to initiate the standard AMR cycle for read of status information from the meter device;
   waiting, by the meter device, for the communication device to initiate the standard AMR cycle through the 3-wire AMR interface; and
   upon detecting the initiation of the standard AMR cycle through the 3-wire AMR interface, releasing, by the meter device, the data line.

2. The method of claim 1, wherein determining if the 3-wire AMR interface is in an idle state comprises detecting, by the meter device, whether there is a clock signal present on the clock line.

3. The method of claim 1, wherein detecting the initiation of the standard AMR cycle through the 3-wire AMR interface comprises detecting, by the meter device, a transition on the clock line.

4. The method of claim 1, wherein signaling the communication device through the data line comprises driving, by the meter device, the data line low by turning on an open-collector transistor.

5. The method of claim 1, wherein the meter device comprises a solid-state register.

6. The method of claim 5, wherein the method is performed in response to a change in state of a status flag associated with an alarm condition in the solid-state register.

7. The method of claim 6, wherein the alarm condition comprises one of a tamper condition, a register removal condition, a backflow condition, or a low battery condition.

8. The method of claim 6, wherein the communication device is configured to forward status information regarding the alarm condition to a central monitoring system upon communicating with the solid-state register.

9. A non-transitory computer-readable storage medium having processor-executable instructions stored thereon that, when executed by a processing unit of a meter device, cause the processing unit to:

detect that a status flag associated with an alarm condition has changed state;

determining, by the meter device, if the 3-wire AMR interface is in an idle state; upon detecting that the status flag has changed state; determine whether a 3-wire AMR interface connecting the meter device to a communication device is idle, the 3-wire AMR interface comprising a data line, a clock line, and a ground/return line and configured for communications between the meter device and the communication device through a standard AMR cycle with the meter device acting as the slave device and the communication device acting as the master device;

upon determining that the 3-wire AMR interface is idle, signal the communication device through the data line of the 3-wire AMR interface to initiate the standard AMR cycle with the meter device to retrieve status information regarding the alarm condition from the meter device;

detect the initiation of the standard AMR cycle through the 3-wire AMR interface by the communication device; and upon detecting the initiation of the standard AMR cycle through the 3-wire AMR interface, releasing the data line.

10. The non-transitory computer-readable storage medium of claim 9, wherein determining if the 3-wire AMR interface is in an idle state comprises detecting whether there is a clock signal present on the clock line.

11. The non-transitory computer-readable storage medium of claim 9, wherein detecting the initiation of the standard AMR cycle through the 3-wire AMR interface comprises detecting a transition on the clock line.

12. The non-transitory computer-readable storage medium of claim 9, wherein signaling the communication device through the data line comprises driving the data line low.

13. A system comprising:
a solid-state register comprising a microcontroller;
a 3-wire AMR interface communicatively connected to the microcontroller and comprising a clock line, a data line, and a return/ground line; and
a communication device electrically connected to the 3-wire AMR interface and configured to periodically initiate a standard AMR cycle to poll the solid-state register for status information, wherein the communication device is configured to act as the master device on the 3-wire AMR interface and the solid-state register is configured to act as the slave device on the 3-wire AMR interface in the standard AMR cycle, and wherein the microcontroller is configured to
detect that a status flag associated with an alarm condition in the solid-state register has changed state,
upon detecting that the status flag has changed state, determine whether the 3-wire AMR interface is in an idle state;
upon determining that the 3-wire AMR interface is in an idle state, signal the communication device through the data line of the 3-wire AMR interface to initiate the standard AMR cycle with the solid-state register,
detect that the communication device has initiated the standard AMR cycle through the 3-wire AMR interface to retrieve status information regarding the alarm condition from the solid-state register, and
upon detecting the initiation of the standard AMR cycle through the 3-wire AMR interface, releasing the data line.

14. The system of claim 13, wherein detecting the initiation of the standard AMR cycle through the 3-wire AMR interface comprises detecting a transition on the clock line.

15. The system of claim 13, wherein signaling the communication device through the data line comprises driving the data line low.

16. The system of claim 15, wherein the data line is free-floating and wherein driving the data line low comprises turning on an open-collector NPN transistor connected to the data line.

17. The system of claim 13, wherein the alarm condition comprises one of a tamper condition, a register removal condition, a backflow condition, or a low battery condition.

* * * * *